United States Patent [19]
Saito et al.

[11] Patent Number: 4,536,131
[45] Date of Patent: Aug. 20, 1985

[54] APPARATUS FOR CONTINUOUS PRESSURE FEEDING OF SLURRY

[75] Inventors: Makoto Saito, Higashiibaraki; Masakatsu Sakamoto, Matsudo; Kenji Uchida, Kashiwa; Yukishige Kamino, Tsuchiura, all of Japan

[73] Assignee: Hitachi, Ltd., Tokyo, Japan

[21] Appl. No.: 578,109

[22] Filed: Feb. 8, 1984

[30] Foreign Application Priority Data

Feb. 28, 1983 [JP] Japan .................................. 58-30709

[51] Int. Cl.³ ........................ F04F 11/00; F04B 15/02
[52] U.S. Cl. .................................... 417/102; 417/103; 417/900
[58] Field of Search ............... 417/101, 102, 103, 137, 417/138, 900

[56] References Cited

U.S. PATENT DOCUMENTS

| | | | |
|---|---|---|---|
| 3,005,417 | 10/1961 | Swaney | 417/138 X |
| 3,907,462 | 9/1975 | Kroeger | 417/102 |
| 3,991,825 | 11/1976 | Morgan | 417/138 X |
| 4,321,016 | 3/1982 | Sakamoto et al. | 417/102 X |

Primary Examiner—Richard E. Gluck
Attorney, Agent, or Firm—Antonelli, Terry & Wands

[57] ABSTRACT

Slurry consisting of water and solid material is fed to fill a plurality of supply chambers arranged in parallel to each other, by the action of slurry pump. The filled slurry is forced to a transferring pipe by the liquid pressure of a high pressure driving liquid pump. A float is positioned on an interface between the slurry and driving liquid within the supply chamber. When a sensor for detecting the position of the float is inoperative due to an external turbulence or the like, a command signal is applied to selected valves in response to a period of time set in a timer.

2 Claims, 2 Drawing Figures

APPARATUS FOR CONTINUOUS PRESSURE FEEDING OF SLURRY

BACKGROUND OF THE INVENTION

The present invention relates to an apparatus for continuous pressure feeding of slurry for use in a liquefying plant or the like and more particularly an apparatus for continuous pressure feeding of slurry, in which even in the case that a sensor for detecting a position of a float is inoperative due to a turbulence from the outside, the operational sequence may be continued.

For instance, in U.S. Pat. No. 3,556,682, there is disclosed an apparatus which comprises a plurality of supply chambers or vessels arranged in parallel, a low pressure pump for filling the supply chambers with slurry consisting of water and solid material and a high pressure pump for driving liquid for discharging the slurry from the supply chambers to a transmitting pipe, and in which a position of a float floating on the interface between the slurry and the driving liquid is detected by an external sensor, and in accordance with the detecting signal, valves interposed in inlet and outlet pipes for the driving liquid and in inlet and outlet pipes for the slurry are selectively opened or closed thereby transferring the slurry by utilizing the pressure of the driving liquid.

However, in the case where the sensors disposed at upper and lower limit positions outside of the supply chambers are inoperative due to an external turbulence (e.g. noises caused by lightning), the operational sequence becomes abnormal or discontinued so that the apparatus as a whole is at a standstill and finally, a continuous operation of the entire plant is no longer possible.

Unless the sensors detect the positions of the float, the following problems are raised. As a first problem, in the case where the upper limit sensor is inoperative resulting in failure in detecting the float position, the float is not stopped at the position of the sensor and it reaches the upper portion of the supply chamber. At the same time, the driving liquid discharge valve is not closed, so that the slurry supplied from the slurry pump passes through the discharge valve and is mixed into the driving liquid tank. The mixed slurry is drawn by the high pressure pump. As a result, the high pressure pump is subjected to a remarkable damage. Also, the operational sequence is discontinued so that the entire apparatus is stopped.

As another problem, in the case where the lower limit sensor is inoperative resulting in failure in detecting the float position, the float is not stopped at the lower limit sensor and it reaches the lower portion of the supply chamber. At the same time, since the driving liquid supply valve is not closed, the driving liquid supplied from the high pressure pump passes a check valve on the transferring pipe, so that the transferring performance of the slurry is lowered. Also, the operational sequence is discontinued so that the entire apparatus is stopped.

SUMMARY OF THE INVENTION

An object of the present invention is to provide an apparatus for continuous pressure feeding of slurry, in which even in the case that a sensor for detecting a position of a float is inoperative due to a turbulence from the outside, the operational sequence may be continued to thereby prevent the stoppage of the overall apparatus.

In order to attain the above-noted object, according to the present invention, there is provided a timer for generating a signal instead of a detecting signal, when a sensor which detects a position of a float floating on an interface between the slurry and the driving liquid in the supply chamber fails to detect the float position due to an external turbulence or the like, a period of time corresponding to the flow rate at that time is set in the timer, and when the period of time lapses, a command signal is outputted to a predetermined valve.

DETAILED DESCRIPTION OF THE PREFERRED EMBODIMENTS

An embodiment of the inventon will now be described with reference to the accompanying drawings.

Figure 1:
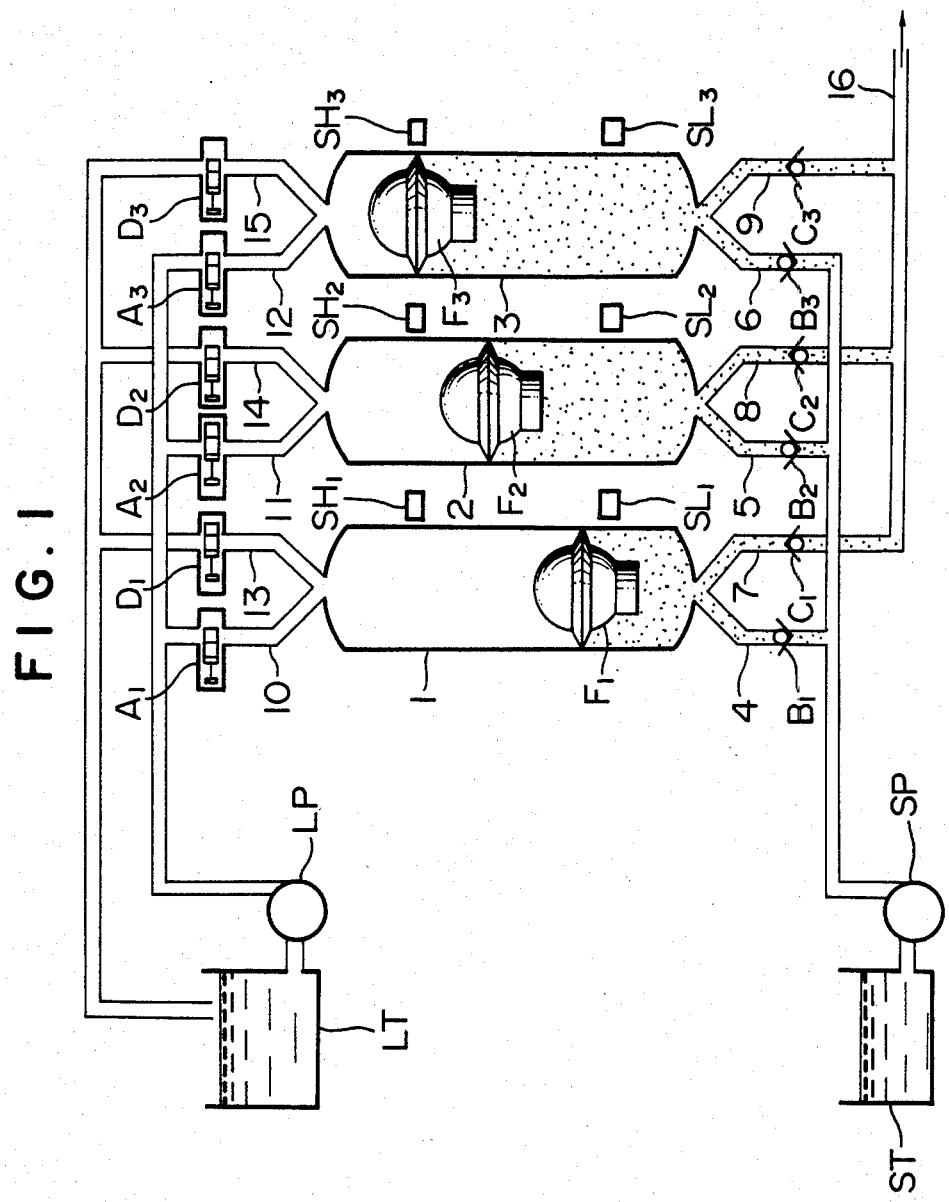
FIG. 1 is a systematic view of an apparatus for continuous pressure feeding of slurry according to the present invention.

In FIG. 1, to upper portions of supply chambers 1-3 for temporary storage of slurry, there are connected driving liquid supply pipes 10-12 for feeding into the supply chambers 1-3 through change-over valve $A_1$-$A_3$ driving liquid, having a specific gravity less than that of the slurry and contained in driving liquid tank LT, by the action of a high pressure pump LP and driving liquid discharge pipes 13-15 for turning the driving liquid back to the driving liquid tank LT through change-over valves $D_1$-$D_3$. Also, the lower portions of the supply chambers 1-3, there are connected slurry supply pipes 4-6 for feeding low pressure slurry from a slurry tank ST through check valves $B_1$-$B_3$ to the supply chambers 1-3 and slurry discharge pipes 7-9 for discharging the slurry through check valves $C_1$-$C_3$. Into the interface between the slurry and the driving liquid within each of the supply chambers 1-3, there is interposed a float $F_1$-$F_3$ which is subjected to a floating power such that it is always located on the interface between the slurry and the driving liquid. Disposed on the outside of the supply chambers 1-3 are sensors $SH_1$-$SH_3$ and $SL_1$-$SL_3$ such as contact switches for detecting upper and lower limit positions of the floats $F_1$-$F_3$.

The operational principle of the slurry pressure feeding with respect to a single supply chamber of the above-described apparatus will now be explained. The supply chamber 1 is filled with the driving liquid. The check valve $C_1$ of the slurry discharge pipe 7 and the change-over valve $A_1$ of the driving liquid supply pipe 10 are both closed. The change-over valve $D_1$ of the driving liquid discharge pipe 13 is opened. In this state, if the slurry pump SP is driven, the slurry is forced into the supply chamber through the check valve $B_1$ of the slurry supply pipe 4 with the check valve $B_1$ being opened, so that the driving liquid contained in the supply chamber 1 is discharged from the change-over valve $D_1$. As a result, the interface between the driving liquid and the slurry is raised or elevated. In response thereto, the position of the float $F_1$ floating on the interface is detected by the sensor $SH_1$. Then the detecting signal is applied to the change-over valve $D_1$ to close the latter. Subsequently, when the change-over valve $A_1$ is opened (assuming that the high pressure pump LP has been operated in advance), the check valve $B_1$ is closed by the driving liquid pressure, the check valve $C_1$ being opened while the driving liquid is acting on the slurry to lower the latter. Thus, the slurry is forced from the lower portion of the supply chamber 1 through the slurry discharge pipe 7 and the check valve $C_1$ to a transferring pipe 16. As a result, the interface between the driving liquid and the slurry is lowered, and in response thereto, the float $F_1$ floating on the interface is also lowered. When the interface is lowered and reaches the lower portion of the supply chamber 1, the position of the lowered float $F_1$ is detected by the sensor $SL_1$. Then the detecting signal is applied to the change-over valve $A_1$ to close the latter. In this state, when the change-over valve $D_1$ is opened, the interface is again raised in level.

By repeating the above-described operation, the single supply chamber makes it possible to forcibly feed into the transferring pipe 16 the slurry contained in the slurry tank ST. In the same manner, the other supply chambers 2, 3 are continuously used, so that the slurry is transferred to the transferring pipe 16.

Figure 2:
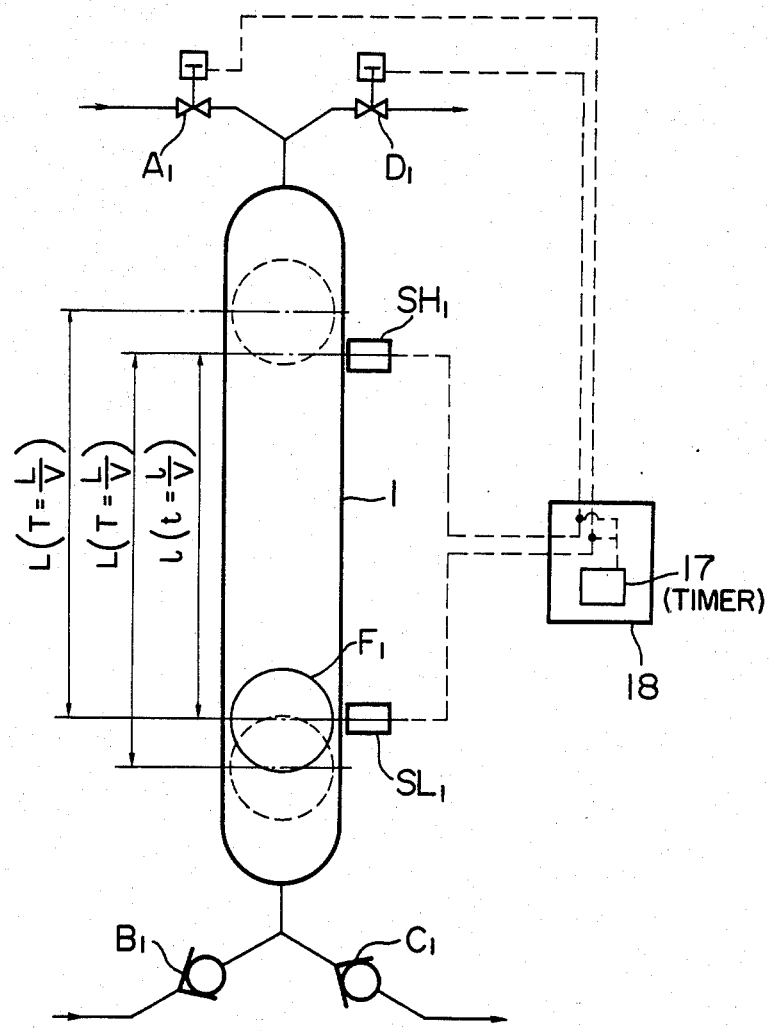
FIG. 2 is a view illustrating a relationship between a timer and a set period of time in the apparatus shown in FIG. 1.

As shown in FIG. 2, a timer 17 provided on a control board 18 is connected to the above described sensors $SH_1$–$SH_3$ and $SL_1$–$SL_3$. Although the timer system is provided only for the supply chamber 1 in FIG. 2, like timer systems are connected to the sensors for the supply chambers 2 and 3 in the same way.

It is assumed that t represents a period of time during which the float $F_1$ travels from the sensor $SL_1$ to the sensor $SH_1$ (or from the sensor $SH_1$ to the sensor $SL_1$) at a flow rate in a normal operation. (Namely, $t=l/V$ where l is the distance between the sensors and V is the float speed).

It is also assumed that T represents a period of time from an instance when the rising float $F_1$ travels from the sensor $SL_1$ to overrun through the sensor $SH_1$ without detection of the position of the float $F_1$ due to an external turbulence or the like to an instance when the float $F_1$ is stopped by closing the change-over valve $D_1$ before the float $F_1$ reaches the upper portion of the supply chamber 1. In the same way, it is assumed that T represents a period of time from an instance when the descending float $F_1$ travels from the sensor $SH_1$ to overrun through the sensor $SL_1$ without detection of the position of the float $F_1$ to an instance when the float $F_1$ is stopped by closing the change-over valve $A_1$ before the float $F_1$ reaches the lower portion of the supply chamber 1. (Namely, $T=L/V$ where L is the distance from the position of the sensor $SH_1$ or $SL_1$ to the position at which the float $F_1$ is stopped after the overrun and V is the float speed.)

The period of time T is set in the timer 17 in advance. With such a construction, in the case where the sensor $SH_1$ or $SL_1$ fails in detecting the position of the float $F_1$ when the float $F_1$ ascends or descends, the float $F_1$ is overrun but at this time, the timer 17 generates a predetermined signal after a lapse of the set period of time T.

At the instance of the lapse of the set period of the timer, the signal is converted into a signal for commanding the valve to be closed. When the float $F_1$ ascends, the change-over valve $D_1$ is closed. When the float $F_1$ descends, the change-over valve $A_1$ is closed.

Thus, even in the case that the sensor fails to detect the position of the float due to an external turbulence or the like, the command signal like the signal of the sensor is generated by the timer. Accordingly, the high pressure driving liquid pump is prevented from being damaged due to the mixture of the slurry into the driving liquid in the tank, and the standstill of the sequential operation may be prevented. Also, since the driving liquid is prevented from being discharged through the check valve to the transferring pipe, the transferring efficiency of the slurry may be enhanced.

Warning means (not shown) is provided on the control board for judging whether the cause for malfunction of the sensor is accidental without reproducibility like noises or is a breakdown of the sensor per se. The warning means is constructed so that when the operational sequence is kept continuous by the operation of the timer 17, a warning signal is outputted for ensuring the entire operation. If the warning signal is generated due to the breakdown of the sensor per se, the warning signal is continuously generated. If the warning signal is due to an accidental factor such as noises, only a single signal is generated and a next normal operation of the sensor is possible.

According to the present invention, even if the sensor fails to detect the position of the float, the apparatus is so constructed that upon the lapse of the set period of time in the timer, a command signal is generated. This makes it possible to continue the operational sequence of the overall apparatus.

What is claimed is:

1. An apparatus for continuous pressure feeding of slurry, including a plurality of supply chambers which are arranged in parallel to each another, each of said supply chambers having an upper portion and a lower portion, driving liquid supply and discharge pipes having valves and connected to the upper portion of each said supply chamber, slurry supply and discharge pipes having valves and connected to the lower portion of each said supply chamber, a float floating on the interface between the driving liquid and the slurry within each of said supply chambers, and sensor means provided around the upper portion and the lower portion of each of said supply chambers wherein the valves of said driving liquid supply and discharge pipes and said slurry supply and discharge pipes are selectively opened and closed for continuous pressure feeding of the slurry, said apparatus characterized in that means are provided for maintaining the continuous pressure feeding of slurry by said apparatus when said sensor means fails to detect the the position of the float, said means for maintaining including a timer for generating a signal instead of a signal of the sensor means, a period of time corresponding to a flow rate within the supply chamber is set in said timer, and when said period of time lapses, a command signal is generated by said timer and selectively applied to said valves.

2. An apparatus for continuous pressure feeding of slurry as claimed in claim 1, wherein said period of time is defined from an instance at which the float starts travelling in one direction to an instance at which the float is stopped by closing the predetermined valve prior to an arrival of the float at the upper or lower portion of the supply chamber after said float has overrun the respective float sensor means provided around the upper and lower portions without detection of the position of the float by the respective sensor means.

* * * * *